United States Patent [19]
Cabuz et al.

[11] Patent Number: 5,822,170
[45] Date of Patent: Oct. 13, 1998

US005822170A

[54] HYDROPHOBIC COATING FOR REDUCING HUMIDITY EFFECT IN ELECTROSTATIC ACTUATORS

[75] Inventors: Cleopatra Cabuz, Edina; Thomas R. Ohnstein, Roseville; Eugen I. Cabuz, Edina, all of Minn.

[73] Assignee: Honeywell Inc., Minneapolis, Minn.

[21] Appl. No.: 948,335

[22] Filed: Oct. 9, 1997

[51] Int. Cl.$^6$ .................................................. H02N 13/00
[52] U.S. Cl. .......................................... 361/225; 361/233
[58] Field of Search .................................... 361/233, 234, 361/225, 230

[56] References Cited

U.S. PATENT DOCUMENTS

| | | | |
|---|---|---|---|
| 5,176,358 | 1/1993 | Bonne et al. . | |
| 5,367,429 | 11/1994 | Tsuchitani et al. | 361/280 |
| 5,658,698 | 8/1997 | Yagi et al. | 430/11 |

OTHER PUBLICATIONS

Cabuz, "Tradeoffs in MEMS Materials," SPIE vol. 2881, p. 160 (Oct. 1996).

Deng, Mehregany, Sukenik, "Performance Impact of Monolayer Coating of Polysilicon Micromotors," 0–7803–2503–6 IEEE (1995).

Maboudian and Howe, "Critical Review: Adhesion in Surface Micromechanical Structures," J. Vac. Sci. Technol. B 15(1) (Jan./Feb. 1997).

Houston, Maboudian, Howe "Assembled Monolayer Films as Durable Anti–Stiction Coatings for Polysilicon Microstructures," Solid–State Sensor and Actuator Workshop (Jun. 2–6, 1996).

Alley, Cuan, Howe, Komvopoulos, "The Effect of Release–Etch Processing on Surface Microstructure Stiction," 0–7803–0456–X/92 IEEE (1992).

Man, Gogoi, Mastrangelo, "Elimination of Post–Release Adhesion in Microstructures using Conformal Fluorocarbon Coatings", Journal of Microelectromechanical systems, vol. 6, No. 1 (Mar. 1997).

Gogoi, Mastrangelo, "Adhesion Release and Yield Enhancement of Microstructures Using Pulsed Lorentz Forces," Journal of Microelectromechanical Systems, vol. 4, No. 4 (Dec. 1995).

Deng, Collins, Mehregany, Sukenik, "Performance Impact of Monolayer Coatingof Polysilicon Micromotors" (1995).

Elders, Jansen, Elwenspoek, "Materials Analysis of Fluorocarbon Films for MEMS Applications".

Tas, Sonnenberg, Jansen, Legtenberg, Elwenspoek, "Stiction in surface micromaching," J. Micromech. Microeng. 6 (1996) no date provided by applicants.

GPI Web Client English abstract w figure of JP405308784A to Konno et al., Nov. 19, 1993.

*Primary Examiner*—Fritz Fleming
*Attorney, Agent, or Firm*—John G. Shudy, Jr.

[57] ABSTRACT

A touch mode electrostatic actuator and method of making the same, having first and second electrode driven surfaces positioned to move between a spaced apart relationship and a contact relationship when dielectric layer on each of the first and second electrode surfaces is subjected to a source of electrical potential to selectively actuate and discharge the dielectric layers to cause the movement between the relationships. The electrostatic actuators of this invention includes a hydrophobic layer for preventing absorption of water thereon, the hydrophobic layers being adapted to cause condensed water to form drops and prevent formation of a continuous water layer. The hydrophobic layer may be a coating on a hydrophilic actuator or, alternatively, may be made entirely from a hydrophobic material. The preferred hydrophobic material is selected from a group consisting of organic materials such as octadecyltrichlorosilane, perfluoro-decyltrichlorosilane, tetrafluoroethylene, and inorganic materials such as a diamond type carbon layer. The hydrophobic layer is electrically isolating and chemically stable in its intended environment. In the preferred embodiments, the hydrophobic material is applied to the hydrophilic dielectric layer by a method selected from dipping, plasma deposition, Langmuir-Blodgett technique, sputtering and CVD deposition.

18 Claims, 3 Drawing Sheets

HYDROPHOBIC COATING FOR REDUCING HUMIDITY EFFECT IN ELECTROSTATIC ACTUATORS

FIELD OF THE INVENTION

The present invention relates to an electrostatic actuator. More particularly the invention relates to a hydrophobic coating used to reduce humidity and improve performance of the electrostatic actuator.

BACKGROUND OF THE INVENTION

Electrostatic actuators have become selected as the solution of choice for actuators that employ low power, operate at high speed, require low cost to produce, and are of small size. These devices present significant advantages: over thermal devices by requiring much less power; over electromagnetic devices using less power and having smaller size; or piezoelectric actuators that have a higher cost and have a much smaller amplitude of motion.

To date, however, there are no commercially available electrostatic actuators. Of particular concern are electrostatic actuation in the presence of dielectrically isolated electrodes, where specific problems are incurred.

In electrostatic actuators, the desired displacement is the result of the attractive electrostatic force generated by the interaction between a distribution of opposite sign charges placed on two bodies, one of which is moveable. For the purposes of this invention, these two bodies are known as actuator plates. The actuator plates are placed apart by a predetermined distance. The charge distribution is then generated by applying a potential difference between two conductive electrodes that are part of the actuator plates. The actuator will be in the ON state or mode when a potential difference is applied between the electrodes and will be in the OFF state when the electrodes are at the same potential.

One family of patents describes fluid control employing microminiature valves, sensors and other components using a main passage between one inlet and exit port and additionally a servo passage between inlet and outlet ports. The servo passage is controlled by a control flow tube such that tabs are moved electrostatically. U.S. Pat. No. 5,176,358 to Bonne et al teaches such a fluid regulating device, while divisional U.S. Pat. Nos. 5,323,999 and 5,441,597 relate to alternative embodiments.

The actual electrostatic device is only briefly described in the above patents, wherein at least one tab formed as part of a dielectric layer moves toward and away from an aperture upon activation of a means for varying the potential of at least one electrode associated therewith to generate an electrostatic force.

The above referenced patents identify another family of patents for further information on microvalves using electrostatic forces. The pending U.S. patent application referred to in those first discussed patents has matured into U.S. Pat. No. 5,082,242 to Bonne et al. This patent describes a microvalve that is an integral structure made on one piece of silicon such that the device is a flow through valve with inlet and outlet on opposite sides of the silicon wafer. The valves are closed by contact with a valve seat where surfaces must be matched in order to avoid degradation of valve performance. Two patents, U.S. Pat. Nos. 5,180,623 and 5,244,527 are divisional patents relating to the first patent. These patents generally describe operation of the electrostatic valve as being driven by various kinds of voltage sources. Specifically, the valve is said to operate as a two position valve with fully open and fully closed positions by applying a DC voltage between electrodes. Also, operation as a proportional control valve is disclosed as being effected by applying a voltage proportional to the voltage necessary to close the valve. Finally, These patents describe operation of the valve with a pulse width modulated voltage signal to modulate gas flow through the valve.

In some electrostatic actuators, the actuator plates have to come in intimate contact during the normal operation cycle. These actuators are sometimes referred to as touch-mode electrostatic actuators. In order to prevent electrical shorting during the touch phase of the operation cycle, the conductive electrodes are isolated from each other by dielectric layers. In order to get the maximum work from a specific device, large electric fields are usually developed between the two conductive electrodes. The non-linear character of the electrostatic attraction results in a snapping action, where the actuator plates move toward each other with accelerations as high as $10^8$ g and speeds that exceed $10^3$ m/sec. After the impact, the free surfaces of the actuator plates are pushed against each other by the large electrostatically generated pressure.

This operation mode creates the possibility of very large mechanical impact and strong interaction forces being developed between the actuator plates. Some of these forces can continue to act after removal of the potential difference between the actuator plates. In some cases, these forces are stronger than the restoring forces available for bringing the electrodes in their original position. In such a case, the two electrodes remain temporarily or permanently attached and the actuator stops functioning as intended and desired. This condition is sometimes referred to as 'stiction.'

Present day touch-mode electrostatic actuators fail to operate properly and effectively in humid environments, such as where the dew point exceeds 5° C. or more, and are functionally inoperative above a dew point of 10°–15° C. In high humidity, electrostatic actuators exhibit an uncontrolled (vibration type) movement even when driven with a DC voltage. It has been discovered herein that layers of water build at the exposed surfaces of the electrostatic actuators, producing a cancellation of the electrostatic field/force at the interface.

It would be of great advantage in the art if a method could be found that would reduce the sensitivity of electrostatic actuators to environmental humidity.

It would be another great advance in the art if touch mode electrostatic actuators could be provided for use with out-of-doors and in many unprotected environments.

Other advantages will appear hereinafter.

SUMMARY OF THE INVENTION

It has now been discovered that the above and other objects of the present invention may be accomplished in the following manner. Specifically, the present invention provides an improved electrostatic actuator device and method of making the same, in which the exposed surfaces of the actuator are hydrophobic. This can be accomplished in two ways: (1) by coating the surfaces of the hydrophilic dielectrics with hydrophobic layers so that water will not be absorbed on the surface; and (2) by using as a dielectric layer a hydrophobic material.

Condensed water, if any, will form drops on the layer, rather than a continuous conductive layer of water. Accordingly, the electrostatic actuation will be effective up to much higher levels of humidity in the environment.

The hydrophobic material is intended to be both electrically isolating and chemically stable in its intended environment. The preferred hydrophobic material is selected from the group consisting of organic or inorganic materials such as octadecyltrichlorosilane, perfluorodecyltrichlorosilane, other fluorinated layers such as tetrafluoroethylene, a diamond type carbon layer, or a diamond like noncomposite such as Dylyn® (trademark material from Advanced Refractory Technology). In the preferred embodiment for making the device of this invention, the hydrophobic layer can be applied by a method selected from spin coating, dipping, plasma deposition, Langmuir-Blodgett technique, and CVD deposition.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
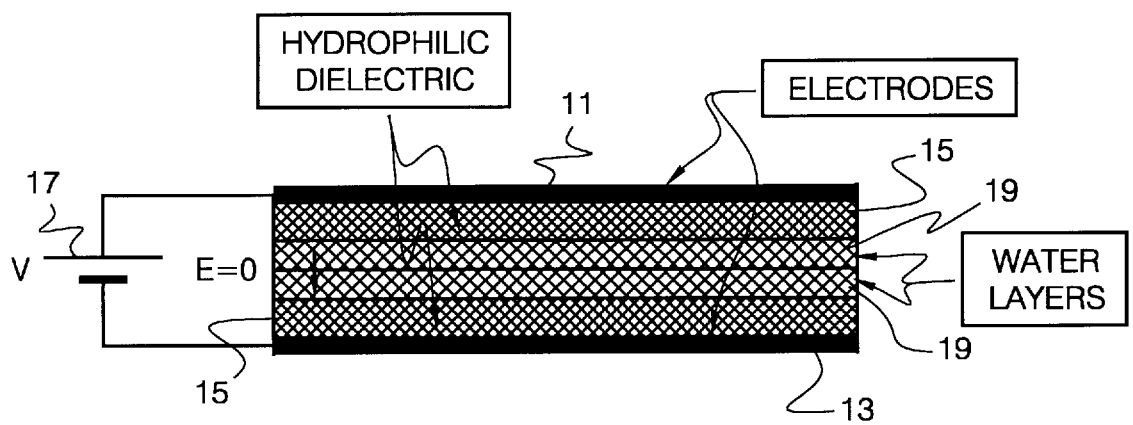
FIG. 1 is a schematic view of a touch mode electrostatic actuator according to the prior art, showing accumulation of water condensed from humidity in its operating environment.

The present invention recognizes and solves a problem that is experienced with electrostatic actuators, especially touch mode electrostatic actuators where the properties of the two surfaces that come into contact have a determining effect on the behavior of the actuator.

Since the electrostatic field is zero inside conductive materials, layers of conductive materials on the contact surfaces of electrostatic actuators will zero the field at the interface and cancel the electrostatic force. As a result, the actuation process will be terminated, irrespective of the applied voltage.

A dielectric is used to isolate the two electrodes in the electrostatic actuators. Most if not all dielectrics are hydrophilic, such as silicon dioxide, silicon nitride (usually covered with a thin, native oxide layer) and the like. Examples of such electrostatic actuators with hydrophilic surfaces are found in the above referenced U.S. Pat. No. 5,176,358 and the patents related thereto.

When such devices are employed in a humid environment, water will easily be adsorbed and/or condensed on the dielectric surfaces, thus forming a relatively conductive layer. The actuation process will be severely affected. As shown in the prior art device of FIG. 1, the two electrodes 11 and 13, having hydrophilic dielectric surfaces 15, will not function when a potential is applied from voltage source 17 because water 19 has formed on the hydrophilic surfaces 15. Water 19 builds up on the exposed surfaces 15 so that the field at the interface is canceled and plates 11 and 13 will move apart under the restoring elastic force that supports the plates.

Figure 2:
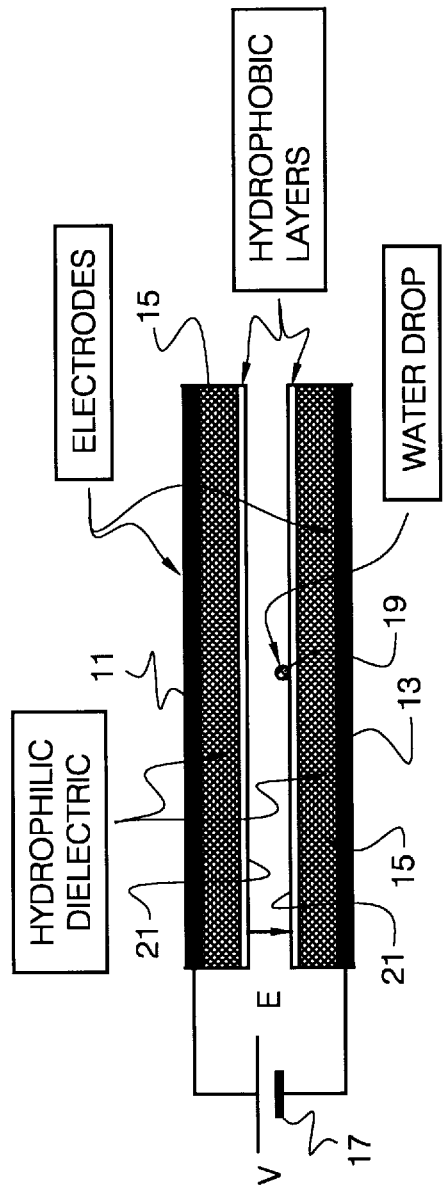
FIG. 2 is a schematic view of a touch mode electrostatic actuator in accordance with the invention, showing prevention of water condensation during operation of the actuator in its operating environment.

Turning now to FIG. 2, the same electrostatic actuator elements are present, including electrodes 11 and 13 with dielectric 15 coated thereon. Application of potential via voltage source 17 is not impeded by the presence of water 19, however, because hydrophilic dielectric surfaces 15 are coated with a hydrophobic layer 21. Alternatively, the device in FIG. 2 could have layers 15 made from a hydrophobic material directly.

In these types of electrostatic actuators, a strong field develops in the gap between the dielectric surfaces 15 as long as an air gap exists at the interface. This creates an attractive electrostatic force E between the two electrode plates 11 and 13, so that these plates will move toward each other. When electrode plates 11 and 13 come into contact at their dielectric surfaces 15, the water layers in FIG. 1 will also come in contact and, given the conductive character and the high dielectric constant of water, the field E will be almost zero at the interface. The plates 11 and 13 will separate under the restoring force of the mechanical structure. As the air gap is formed again, the plates will again be pulled together, and so on. The actuator itself will vibrate instead of staying closed. Such behavior has been observed whenever electrostatic actuators driven with DC voltages are used in humid environments. Of course, this behavior is highly detrimental to valve type applications.

The effect of the relatively high surface conductivity induced by the absorbed water layer can be reduced by driving the actuator with a square wave AC voltage, however even with an AC drive, the electrostatic pressure generated by an actuator with hydrophilic surfaces drops significantly in the presence of high humidity.

A series of tests were made to compare the prior art uncoated design of FIG. 1 with the device of this invention as shown in FIG. 2. Both devices were operated as electrostatic actuators at an alternating current square wave voltage of 25 Volts peak, and at a frequency of 100 Hz. In a controlled atmospheric environment, the dew point in °C. was increased at an ambient temperature of 21° C. and the electrostatic pressure developed to hold the dielectric electrode plates in contact was evaluated.

Figure 3:
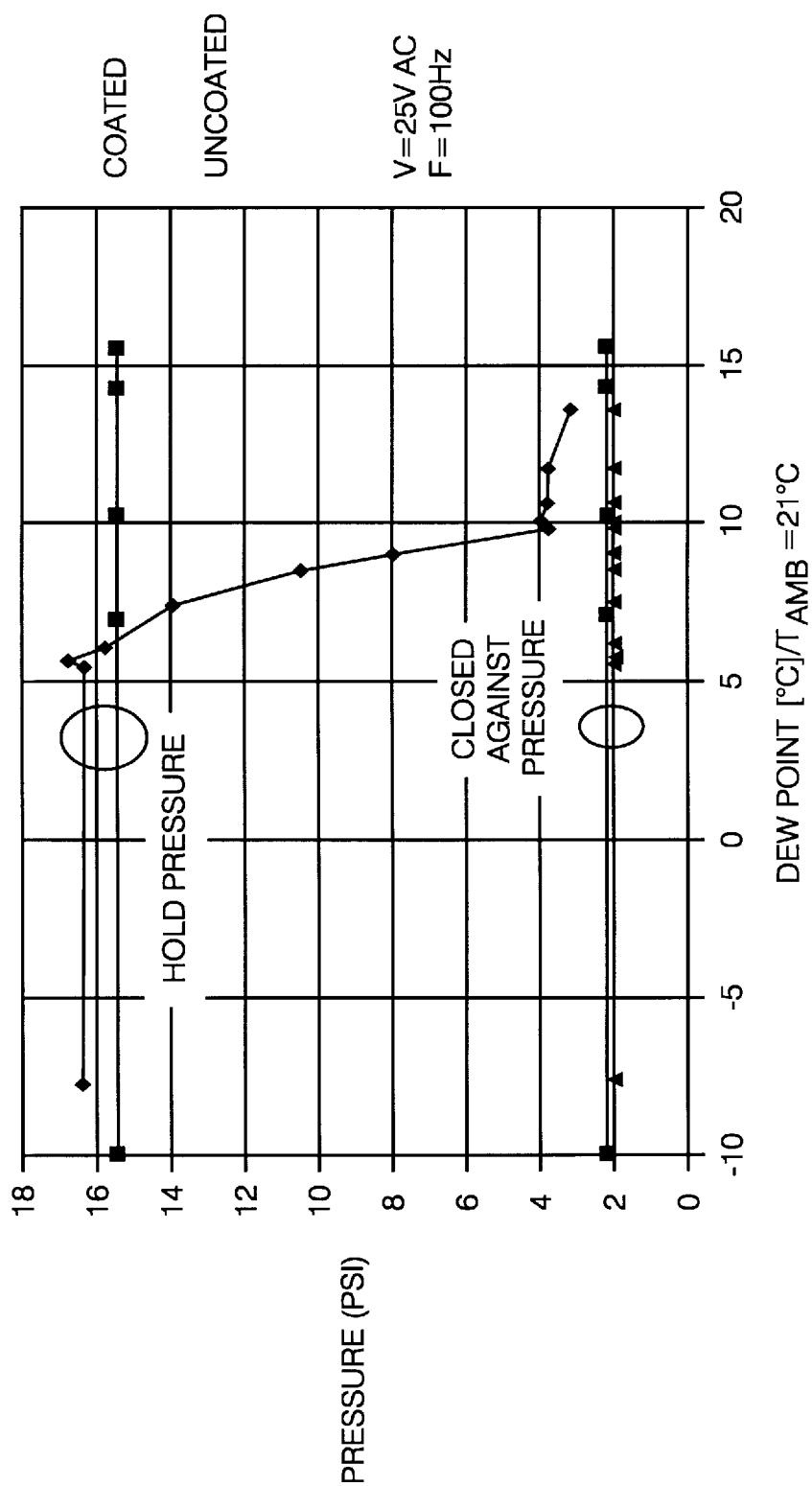
FIG. 3 is a graph illustrating the performance of the devices of FIGS. 1 and 2, showing the superior performance of the present invention.

FIG. 3 is a plot of the results of these tests. As can readily be seen, the prior art device of FIG. 1 produced a curve 25 that dropped off rapidly at a dew point of about 6°–8° C. while the present invention device of FIG. 2 remained unaffected by humidity at a dew point over 15° C.

It is clear from these tests that the present invention provides a superior range of performance. In point of fact, the present invention is operable under conditions where the prior art devices can not even operate, due to the adverse effects of humidity on the hydrophilic dielectric surfaces of the actuator.

By coating the exposed surfaces of the hydrophilic dielectric with a hydrophobic material, or by using hydrophobic materials as dielectric, water adsorption on the surface is prevented. Water drops, if any, will not wet the surfaces and will easily be pushed away by the operation of the electrodes.

The actuation process will work properly up to much higher levels of humidity in the environment. As a result, because of the present invention and the use of hydrophobic coatings and/or hydrophobic materials, electrostatic actuators can operate in a less controlled atmosphere, opening up opportunities for a broad range of industrial, commercial and hope applications. Microvalves for pneumatic controls and micropumps will have a much more diverse field of application.

While particular embodiments of the present invention have been illustrated and described, it is not intended to limit the invention, except as defined by the following claims.

We claim:

1. A touch mode electrostatic actuator device, comprising:
   first and second electrode driven surfaces positioned to move between a spaced apart relationship and a contact relationship;

a hydrophilic dielectric layer on each of said first and second electrode surfaces;

a source of electrical potential to selectively actuate and discharge said dielectric layers to cause said movement between said relationships; and a hydrophobic layer on each of said hydrophilic layers for preventing absorption of water thereon, said hydrophobic layers being adapted to prevent cancellation of the electrostatic field/force at the interface of said hydrophobic layers and to cause condensed water to form drops and prevent formation of a continuous water layer, whereby vibratory motion between said surfaces of said actuator is prevented.

2. The device of claim 1, wherein said hydrophobic layer is selected from a group consisting of organic materials and inorganic material.

3. The device of claim 1, wherein said hydrophobic layer is electrically isolating and chemically stable in its intended environment.

4. The device of claim 1, wherein said hydrophobic layer is applied to said hydrophilic dielectric layer by a method selected from dipping, plasma deposition, Langmuir-Blodgett technique, and CVD deposition.

5. In a touch mode electrostatic actuator having a first and second electrode driven surfaces positioned to move between a spaced apart relationship and a contact relationship, a hydrophilic dielectric layer on each of said first and second electrode surfaces, and a source of electrical potential to selectively actuate and discharge said dielectric layers to cause said movement between said relationships, the improvement comprising:

a hydrophobic layer on each of said hydrophilic layers for preventing absorption of water thereon, said hydrophobic layers being adapted to prevent cancellation of the electrostatic field/force at the interface of said hydrophobic layers and to cause condensed water to form drops and prevent formation of a continuous water layer, whereby vibratory motion between said surfaces of said actuator is prevented.

6. The device of claim 5, wherein said hydrophobic layer is selected from a group consisting of organic materials and inorganic materials.

7. The device of claim 5, wherein said hydrophobic layer is electrically isolating and chemically stable in its intended environment.

8. The device of claim 5, wherein said hydrophobic layer is applied to said hydrophilic dielectric layer by a method selected from dipping, plasma deposition, Langmuir-Blodgett technique, and CVD deposition.

9. A method of making a touch mode electrostatic actuator, comprising the steps of:

forming first and second electrode driven surfaces and positioning said surfaces to move between a spaced apart relationship and a contact relationship;

forming a hydrophilic dielectric layer on each of said first and second electrode surfaces;

providing a source of electrical potential to selectively actuate and discharge said dielectric layers to cause said movement between said relationships; and forming a hydrophobic layer on each of said hydrophilic layers for preventing absorption of water thereon, said hydrophobic layers being adapted to prevent cancellation of the electrostatic field/force at the interface of said hydrophobic layers and to cause condensed water to form drops and prevent formation of a continuous water layer, whereby vibratory motion between said surfaces of said actuator is prevented.

10. The method of claim 9, wherein said hydrophobic layer is selected from a group consisting of organic materials and inorganic materials.

11. The device of claim 9, wherein said hydrophobic layer is electrically isolating and chemically stable in its intended environment.

12. The device of claim 9, wherein said hydrophobic layer is applied to said hydrophilic dielectric layer by a method selected from dipping, plasma deposition, Langmuir-Blodgett technique, and CVD deposition.

13. A method of making a touch mode electrostatic actuator, comprising the steps of:

forming first and second electrode driven surfaces and positioning said surfaces to move between a spaced apart relationship and a contact relationship;

forming a hydrophobic dielectric layer on each of said first and second electrode surfaces for preventing absorption of water thereon, said hydrophobic layers being adapted to prevent cancellation of the electrostatic field/force at the interface of said hydrophobic layers and to cause condensed water to form drops and prevent formation of a continuous water layer, whereby vibratory motion between said surfaces of said actuator is prevented; and providing a source of electrical potential to selectively actuate and discharge said dielectric layers to cause said movement between said relationships.

14. The method of claim 13, wherein said hydrophobic layer is selected from a group consisting of organic materials and inorganic materials.

15. The device of claim 13, wherein said hydrophobic layer is applied by a method selected from dipping, plasma deposition, Langmuir-Blodgett technique, sputtering and CVD deposition.

16. A touch mode electrostatic actuator device, comprising:

first and second electrode driven surfaces positioned to move between a spaced apart relationship and a contact relationship;

a hydrophobic dielectric layer on each of said first and second electrode surfaces, said hydrophobic layer being adapted to prevent cancellation of the electrostatic field/force at the interface of said hydrophobic layers and to cause condensed water to form drops and prevent formation of a continuous water layer whereby vibratory motion between said surfaces of said actuator is prevented; and a source of electrical potential to selectively actuate and discharge said dielectric layers to cause said movement between said relationships.

17. The device of claim 16, wherein said hydrophobic layer is selected from a group consisting of organic materials and inorganic materials.

18. The device of claim 16, wherein said hydrophobic layer is applied to said electrode surfaces by a method selected from dipping, plasma deposition, Langmuir-Blodgett technique, sputtering and CVD deposition.

* * * * *